(12) United States Patent
Elkatatny et al.

(10) Patent No.: US 11,781,054 B1
(45) Date of Patent: Oct. 10, 2023

(54) WEIGHTED DRILLING FLUID CONTAINING METAL-MODIFIED PHYLLOSILICATE

(71) Applicant: KING FAHD UNIVERSITY OF PETROLEUM AND MINERALS, Dhahran (SA)

(72) Inventors: Salaheldin Elkatatny, Dhahran (SA); Salem Basfar, Dhahran (SA); Abdelmjeed Mohamed, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/874,756

(22) Filed: Jul. 27, 2022

Related U.S. Application Data (60) Provisional application No. 63/332,873, filed on Apr. 20, 2022.

(51) Int. Cl.
   *C09K 8/16* (2006.01)
   *C09K 8/14* (2006.01)

(52) U.S. Cl.
   CPC .............. *C09K 8/16* (2013.01); *C09K 8/145* (2013.01); *C09K 2208/18* (2013.01)

(58) Field of Classification Search
   None
   See application file for complete search history.

(56) References Cited

U.S. PATENT DOCUMENTS

| | | | | | |
|---|---|---|---|---|---|
| 3,855,147 | A | * | 12/1974 | Granquist | A61Q 19/00 507/140 |
| 3,959,118 | A | * | 5/1976 | Granquist | C10G 11/05 208/120.25 |
| 4,208,218 | A | * | 6/1980 | Finlayson | C09D 7/43 106/287.3 |

(Continued)

FOREIGN PATENT DOCUMENTS

| | | |
|---|---|---|
| AU | 2015288141 B2 | 1/2016 |
| CN | 103923622 A | 7/2014 |

(Continued)

OTHER PUBLICATIONS

Elkatatny, et al.; Properties of Ilmenite Water-Based Drilling Fluids for HPHT Applications; International Petroleum Technology Conference 16983; Mar. 26-28, 2013; 15 Pages.

(Continued)

*Primary Examiner* — Charles R Nold
(74) *Attorney, Agent, or Firm* — Oblon, McClelland, Maier & Neustadt, L.L.P.

(57) ABSTRACT

A drilling fluid formulation is provided, which includes an aqueous base fluid, a synthetic modified phyllosilicate as an anti-sagging additive, an inorganic base, and a weighting agent (e.g. barite). The synthetic modified phyllosilicate contains a clay material (e.g. smectite) and a metal selected from ruthenium, rhodium, palladium, osmium, iridium, and platinum. The synthetic modified phyllosilicate is effective in preventing barite sagging as demonstrated by low sag factor when drilling at elevated temperatures. Rheology properties of the drilling fluid including gel strength, yield point, plastic viscosity, and storage modulus are also specified.

20 Claims, 6 Drawing Sheets

(56) References Cited

U.S. PATENT DOCUMENTS

| | | | | |
|---|---|---|---|---|
| 4,410,364 | A | * | 10/1983 | Finlayson ............... C01B 33/44 |
| | | | | 106/31.75 |
| 4,412,018 | A | * | 10/1983 | Finlayson ................ C09K 8/32 |
| | | | | 556/172 |
| 4,517,112 | A | * | 5/1985 | Mardis .................... C01B 33/44 |
| | | | | 507/252 |
| 2008/0169130 | A1 | * | 7/2008 | Norman ................... C09K 8/34 |
| | | | | 175/65 |
| 2019/0055448 | A1 | | 2/2019 | Mohammed et al. |
| 2020/0317981 | A1 | * | 10/2020 | Mohamed ................ C09K 8/16 |
| 2020/0377723 | A1 | * | 12/2020 | Bernert ............. C08G 18/2825 |

FOREIGN PATENT DOCUMENTS

| | | |
|---|---|---|
| EP | 1 814 958 B1 | 5/2015 |
| EP | 2 655 540 B1 | 9/2016 |

OTHER PUBLICATIONS

Abdou, et al. ; Impact of barite and ilmenite mixture on enhancing the drilling mud weight; Egyptian Journal of Petroleum 27; pp. 955-967 ; 2018 ; 13 Pages.

Fuhua, et al . ; High temperature and high pressure rheological properties of high-density water-based drilling fluids for deep wells; Pet. Sci. 9 ; pp 354-362 ; 2012 ; 9 Pages.

Abdo, et al. ; Clay nanoparticles modified drilling fluids for drilling of deep hydrocarbon wells ; Applied Clay Science 86 ; pp 76-82 ; 2013 ; 8 Pages.

* cited by examiner

WEIGHTED DRILLING FLUID CONTAINING METAL-MODIFIED PHYLLOSILICATE

CROSS-REFERENCE TO RELATED APPLICATION

The present application claims priority to U.S. Provisional Application No. 63/332,873, filed Apr. 20, 2022, incorporated by reference in its entirety for all purposes.

BACKGROUND OF THE INVENTION

Field of the Invention

The present disclosure relates to a drilling fluid with low sag tendency. The drilling fluid contains a barite weighting agent, and a metal-modified phyllosilicate clay.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Drilling fluids contain a mixture of suspended solids and dissolved liquids. Solids are present as a discontinuous phase dispersed in the liquid (or continuous) phase. Drilling fluids are introduced during drilling operations to fulfill many functions, including: (i) lubricating and cooling of the drill bit and drill string [Gordon, C., Lewis, S., Tonmukayakul, P., 2008. Rheological properties of cement spacer: mixture effects. In: AADE Fluids Conference and Exhibition Held in Houston, Texas, AADE-08-DF-HO-09, 8-9 April], (ii) transporting drilled cuttings to the surface during drilling and suspending it in the drilling fluid once drilling operation stops [Fink, J. K., 2012. Petroleum engineer's guide to oil field chemicals and fluids. Waltham, MA: Gulf Professional Pub], (iii) preventing formation fluids from invading the wellbore hole, and (iv) maintaining the wellbore stability by creating a low permeability film on the borehole's wall (i.e. filter cake) [Bourgoyne, Jr. A. T., Chenevert, M. E., Millheim, Keith, K., Young, Jr. F. S., 1986. Applied Drilling Engineering; Rabia, H., 2001. Well Engineering and Construction. Entrac Consulting; and Hossain, M., Al-Majed, A. A., 2015. Fundamentals of Sustainable Drilling Engineering. John Wiley & Sons].

Another function of drilling fluid is to control the formation pressure by applying a sufficient hydrostatic pressure on the formation [Stroud, B. K., 1922. Mud-laden Fluids and Tables on Specific Gravities and Collapsing Pressures, Louisiana Department of Conservation]. Various weighting materials such as barite, ilmenite, and manganese tetra oxide can be used to generate the hydrostatic pressure of drilling fluid [Rugang, Y., Guancheng, J., Wei, L., Tianqing, D., Hongxia, Z., 2014. Effect of water-based drilling fluid components on filter cake structure. Powder Technoogy 262, 51-61; Elkatatny, S. M., Nasr-El-Din, H., and Al-Bagoury, M. 2013. Evaluation of Micronized Ilmenite as Weighting Material in Water-Based Drilling Fluids for HPHT Applications. Paper SPE 163377 presented at the SPE Kuwait International Petroleum Conference and Exhibition held in Kuwait City, Kuwait, December 10-12; Elkatatny, S. M., A. Al Moajil, and Nasr-El-Din, H. A. 2012. Evaluation of a New Environmentally Friendly Treatment to Remove $Mn_3O_4$ Filter Cake. Paper SPE 156451 presented at the IADC/SPE Asia Pacific Drilling Technology Conference (APDT), Tianjin, China, July 9-11; Al-Yami, A. S., Nasr-El-Din, H. A., Al-Majed, A. A., Menouar, H., 2007. An Innovative Manganese Tetra-Oxide/KCl Water-Based Drill-in Fluids for HT/HP Wells. Paper SPE-110638 presented at the SPE Annual Technical Conference and Exhibition. California, November 11-14; and Tehrani, A., Cliffe, A., Hodder, M. H., Young, S., Lee, J., Stark, J., Seale, S., 2014. Alternative Drilling Fluid Weighting Agents: A Comprehensive Study on Ilmenite and Hematite. Paper IADC/SPE-167937 presented at the IADC/SPE Drilling Conference and Exhibition. Texas. March 4-6]. However, the heavy weighting agents often cause damage to the formation leading to a reduction in well production. Particle sagging is a common issue encountered particularly when drilling high-pressure high-temperature formations.

Barite is one of the common weighting materials in drilling and completion fluids. While barite has many desirable characteristics for a weighting agent, such as high density, low environmental impact, and low production cost, barite weighting agents can cause solid invasion which leads formation damage and permeability reduction near the wellbore. Another major problem that is usually encountered with barite-weighted drilling fluids is the separation of the barite particles from the liquid phase and settling, causing variations in fluid density that may result in loss of well control [Mohamed, A. K., Elkatatny, S. A., Mahmoud, M. A., Shawabkeh, R. A., Al-Majed, A. A., 2017. The Evaluation of Micronized Barite as a Weighting Material for Completing HPHT Wells. Paper SPE183768-MS presented at the SPE Middle East Oil & Gas Show and Conference, Manama, Kingdom of Bahrain, 6-9 March, incorporated herein by reference in its entirety].

Barite sag, or solids sag, is a complex phenomenon and very likely to occur in deviated wells especially in low-shear cases [Hanson, P. M., Trigg, T. K., Rachal, G., and Zamora, M., 1990. Investigation of Barite "Sag" in Weighted Drilling Fluids in Highly Deviated Wells. Paper SPE 20423 presented at the 65th Annual Technical Conference and Exhibition. New Orleans. September 23-26]. Optimization and monitoring for drilling fluid rheological properties, and training for drilling personnel would help manage solids sagging and mitigate its consequences [Scott, P. D., Zamora, M., Aldea, C., 2004. Barite-Sag Management: Challenges, Strategies, Opportunities. Paper IADC/SPE 87136 presented at the IADC/SPE Drilling Conference. Dallas.].

One strategy to prevent barite sag is to modify the weighting material without adding a stability enhancer to the drilling fluid. Alabdullatif et al proposed a combination of $Mn_3O_4$ and barite as a weighting material in water-based kill fluid to mitigate the problem of barite sag. Adding $Mn_3O_4$ to the fluid formulation effectively enhanced the fluid stability and minimized the possibility of solids sag, particularly over a long time at static conditions [Alabdullatif, Z., Al-yami, A., Wagle, V., Bubshait, A., Al-safran, A., Aramco, S., 2015. Development of New Kill Fluids with Minimum Sagging Problems for High Pressure Jilh Formation in Saudi Arabia. Saudi Aramco J. Technoll. Mohamed et al. investigated the impact of barite particle size reduction on the stability of water-based mud using the sag test and zeta potential measurements. It was concluded that decreasing barite particle size to micronized size slightly enhances the drilling fluid stability, but does not eliminate the sag issue [Mohamed, A. K., Elkatatny, S. A., Mahmoud, M. A., Shawabkeh, R. A., Al-Majed, A. A., 2017. The Evaluation of Micronized Barite as a Weighting Material for Completing HPHT Wells. Paper SPE183768-MS presented at the SPE Middle East Oil & Gas Show and Conference, Manama, Kingdom of Bahrain, 6-9 March]. Basfar et al. and Mohamed et al. studied the effect of using barite-ilmenite combined weighting material on the properties of the water-based and oil-based drilling fluids. It was found that the combined weighting material greatly enhanced the rheological properties and the stability of the drilling fluid and prevented solids sag in both vertical and inclined conditions [Basfar, S., Mohamed, A., Elkatatny, S., Al-Majed, A., 2019. A combined barite-ilmenite weighting material to prevent barite sag in water-based drilling fluid. Materials, 12(12), 1-13; and Mohamed, A., Basfar, S., Elkatatny, S., Al-Majed, M., 2019. Prevention of Barite Sag in Oil-Based Drilling Fluids Using a Mixture of Barite and Ilmenite as Weighting Material. Sustainability, 11(20), 5617, each of which is incorporated herein by reference in its entirety]. However, using a combined weighting agent would add more cost and introduce another challenge to the drilling fluid operation, which is the removal of the composite filter cake because the weighting material contributes greatly to filter cake formation, 70 to 80 wt. % [Ba geri, B. S., Mahmoud, M. A., Al-Mutairi, S. H., Abdulraheem, A., 2016. Effect of Sand Content on the Filter Cake Properties and Removal During Drilling Maximum Reservoir Contact Wells in Sandstone Reservoir. Journal of Energy Resources Technology, 138(3), 32901].

Another strategy to prevent barite sag is the addition of drilling fluid additives which serve to stabilize the barite particles in suspension. Temple et al. introduced a low molecular weight polyalkyl methacrylate additive to enhance the stability of oil-based fluids without increasing the drilling fluid viscosity [Temple, C., Paterson, F., Leith, D., 2004. Method for Reducing Sag in Drilling, Completion, and Workover Fluids. International publication no. WO 2004/113467A1]. Davis et al. used polyethylene glycol (PEG) to prevent barite sag in oil-based mud [Davis, L., Lfvanec, W., and Shumway, W., Additive to enhance sag stability of drilling fluid, International publication number WO 2017/188946 A1]. Basfar, S., Elkatatny, S., Mahmoud, M., Kamal, M. S., Murtaza, M., and Stanitzek, T., 2018. Prevention of Barite Sagging while Drilling High-Pressure High-Temperature (HPHT) Wells. Paper SPE-192198-MS presented at the SPE Kingdom of Saudi Arabia Annual Technical Symposium and Exhibition. Dammam. April 23-26, incorporated herein by reference in its entirety] and Elkatatny [Elkatatny, S. M. 2018. Enhancing the Stability of Invert Emulsion Drilling Fluid for Drilling in High-Pressure High-Temperature Conditions. Energies, 11(9), 2393, incorporated herein by reference in its entirety] studied the effect of styrene and acrylic based copolymers on sag tendency of invert emulsion drilling fluids at different temperatures. It was found that addition of only 1 $lb_m$/bbl of the copolymer prevented barite sag at both vertical and inclined conditions at a temperature of up to 350° F. Boyou et al. performed an experimental study on the use of nano-silica to improve the suspension capability of the water-based fluids for directional wells drilling applications. Different concentrations of nano-silica were used, and the experiments were conducted in a flow loop setup at different inclination angles. It was found that nano-silica increased the colloidal interaction with cuttings; therefore, the cuttings transport efficiency was significantly improved in all inclination angels [Boyou, N. V., Ismail, I., Wan Sulaiman, W. R., Sharifi, H. A., Husein, N., Hui, H. T., Nadaraja, K., 2019. Experimental investigation of hole cleaning in directional drilling by using nano-enhanced water-based drilling fluids. J. Pet. Sci. Eng., 176 (2019), 220-231].

Despite these recent advances, there is still need to develop new additives to enhance fluid stability and prevent sagging in drilling fluids, particularly for water-based drilling fluids. In view of the forgoing, one objective of the present disclosure is to provide a drilling fluid formulation containing an anti-sagging additive (e.g., a metal-modified phyllosilicate). The drilling fluid demonstrates improved rheology properties and drilling capability at elevated temperatures.

SUMMARY OF THE INVENTION

The present disclosure relates to a drilling fluid, comprising an aqueous base fluid, an inorganic base, a weighting agent comprising barite, and a synthetic modified phyllosilicate present in an amount of 0.05 to 0.2 wt % based on a total weight of the drilling fluid, wherein the synthetic modified phyllosilicate comprises 60 to 70 wt % of Si, 25 to 35 wt % of Mg, 1.8 to 2.8 wt % of Na, and 1.7 to 2.7 wt % of a metal which is at least one selected from the group consisting of ruthenium, rhodium, palladium, osmium, iridium, and platinum, each relative to a total weight of XRF-active elements present in the synthetic modified phyllosilicate.

In some embodiments, the metal is palladium.

In some embodiments, the synthetic modified phyllosilicate is a synthetic modified smectite-type clay.

In some embodiments, the synthetic modified phyllosilicate is in the form of particles with an average particle size in a range of 4.5 to 15 µm.

In some embodiments, the drilling fluid has a pH of 10 to 14.

In some embodiments, the inorganic base is an alkali metal hydroxide.

In some embodiments, the aqueous base fluid is substantially free of an oil phase.

In some embodiments, the drilling fluid further comprises at least one selected from the group consisting of a viscosifier, a fluid-loss control agent, a clay stabilizer, and a bridging agent.

In some embodiments, the viscosifier is at least one selected from the group consisting of bentonite and xanthan gum.

In some embodiments, the fluid-loss control agent is at least one selected from the group consisting of starch and a polyanionic cellulose polymer.

In some embodiments, the clay stabilizer is potassium chloride.

In some embodiments, the bridging agent is calcium carbonate.

In some embodiments, the drilling fluid has a density of 12 to 18 ppg.

In some embodiments, the drilling fluid has a static sag factor in a range of 0.480 to 0.525 at a vertical condition, at a temperature of 175 to 325° F., and a pressure of 300 to 800 psi.

In some embodiments, the drilling fluid has a static sag factor in a range of 0.480 to 0.525 at an inclined condition of 30 to 60°, at a temperature of 175 to 325° F., and a pressure of 300 to 800 psi.

In some embodiments, the drilling fluid has a dynamic sag tendency in a range of 0.05 to 1.5 ppg at a temperature of 75 to 200° F. and a shear rate of 50 to 200 RPM.

In some embodiments, the drilling fluid has a ten-second gel strength of 20 to 32 lb/100 ft$^2$, a ten-minute gel strength of 50 to 95 lb/100 ft$^2$, and a thirty-minute gel strength of 60 to 110 lb/100 ft$^2$, at a temperature of 75 to 200° F.

In some embodiments, the drilling fluid has a plastic viscosity of 35.5 to 40 cP at a temperature of 75 to 200° F.

In some embodiments, the drilling fluid has a yield point of 35 to 55 lb/100 ft$^2$ at a temperature of 75 to 200° F.

The present disclosure also relates to a method of drilling a subterranean geological formation, comprising driving a drill bit to form a wellbore in the subterranean geological formation and injecting the drilling fluid of claim 1 into the subterranean geological formation through the wellbore wherein the synthetic modified phyllosilicate prevents sagging of the weighting agent in the wellbore.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

In the following description, it is understood that other embodiments may be utilized and structural and operational changes may be made without departure from the scope of the present embodiments disclosed herein.

Definitions

As used herein the words "a" and "an" and the like carry the meaning of "one or more."

As used herein, the terms "optional" or "optionally" means that the subsequently described event(s) can or cannot occur or the subsequently described component(s) may or may not be present (e.g., 0 wt. %).

As used herein, the words "about" or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values).

According to a first aspect, the present disclosure relates to a drilling fluid, comprising an aqueous base fluid, an inorganic base, a weighting agent comprising barite, and a synthetic modified phyllosilicate.

Phyllosilicate, or sheet silicate, forms parallel sheets of tetrahedral silicate where each silicate sheet contains $Si_4O_{10}$ or has a molar ratio of Si:O of 2:5. Examples of phyllosilicate include serpentine, clay minerals, mica, and chlorite. Preferably, phyllosilicate of the present disclosure may refer to a type of clay mineral.

Clay minerals are characterized by two-dimensional sheets of corner sharing $SiO_4$ tetrahedra and/or $AlO_4$ octahedra. The sheet units have the chemical composition $(Al, Si)_3O_4$. Each silica tetrahedron shares 3 of its vertex oxygen atoms with other tetrahedra forming a hexagonal array in two-dimensions. The fourth vertex is not shared with another tetrahedron and all of the tetrahedra "point" in the same direction; i.e. all of the unshared vertices are on the same side of the sheet.

In clay minerals, the tetrahedral sheets are bonded to octahedral sheets formed from small cations, such as aluminum, magnesium, and lithium, and are coordinated by six oxygen atoms. Each unshared vertex from the tetrahedral sheet also forms part of one side of the octahedral sheet, but an additional oxygen atom is located above the gap in the tetrahedral sheet at the center of the six tetrahedra. This oxygen atom is bonded to a hydrogen atom forming an OH group in the clay structure. Clay minerals can be categorized depending on the way that tetrahedral and octahedral sheets are packaged into layers. If there is only one tetrahedral and one octahedral group in each layer, the clay is known as a 1:1 clay. The alternative, known as a 2:1 clay, has two tetrahedral sheets with the unshared vertex of each sheet pointing towards each other and forming each side of the octahedral sheet. In other words, a tetrahedral double layer sandwiches an octahedral layer.

Bonding between the tetrahedral and octahedral sheets may require that the tetrahedral sheet becomes corrugated or twisted, causing ditrigonal distortion to the hexagonal array, and the octahedral sheet may be flattened. This minimizes the overall bond-valence distortions of the crystallite. Depending on the composition of the tetrahedral and octahedral sheets, the layer will have no charge, or will have a net negative charge. If the layers are charged this charge is balanced by interlayer cations such as $Na^+$ or $K^+$. In each case, the interlayer may contain water. The crystal structure is formed from a stack of layers interspaced with the interlayers.

Exemplary types of clay mineral include, but are not limited to, smectite, kaolin, illite, chlorite, sepiolite, attapulgite, or some other type. Smectites include dioctahedral smectites such as montmorillonite, nontronite, bentonite, and beidellite, as well as trioctahedral smectites such as saponite, hectorite, and stevensite. In general, dioctahedral smectites have an average of 2 of every 3 octahedral sites occupied by a cation, while trioctahedral smectites have approximately all 3 of every 3 octahedral sites occupied by a cation. Kaolins include the minerals kaolinite, dickite, halloysite, and nacrite. Illites include clay-micas and illite. Chlorites include baileychlore, chamosite, clinochlore, cookeite, donbassite, gonyerite, nimite, odinite, orthochamosite, pennantite, ripidolite, and sudoite. Other 2:1 clay types exist such as sepiolite or attapulgite. Preferably, the clay mineral described herein is a smectite-type clay. The smectite-type clay may be a natural clay or a synthetic clay. In at least one embodiment, the clay mineral used herein is devoid of attapulgite clays.

Hectorite is a clay mineral having a formula of $Na_{0.3}(Mg,Li)_3Si_4O_{10}(OH)_2$. Laponite refers to a synthetic trioctahedral smectite clay having a composition similar to hectorite. In some embodiments, the clay mineral is the smectite-type clay that includes a laponite. It is equally envisaged that the clay mineral may contain other clay types as previously specified, preferably other smectite-type clays in addition to or in lieu of the laponite. For example, the clay mineral may include a mixture of nontronite, beidellite, saponite, and/or stevensite in addition to or in lieu of the bentonite. Preferably, the laponite is present in the smectite-type clay in an amount greater than 50 wt %, preferably greater than 70 wt %, more preferably greater than 90 wt %, relative to a total weight of the smectite-type clay. In some embodiments, the laponite is a fluorinated laponite. A fluorinated laponite refers to a to a synthetic trioctahedral smectite clay having a composition similar to fluorohectorite. Fluorohectorite is a hectorite in which some or all of the hydroxyl moieties are replaced with fluoride anions. In some embodiments, the smectite-type clay is substantially free of fluorinated laponite. In some embodiments, the smectite-type clay is substantially free of fluoride anions.

In some embodiments, the synthetic modified phyllosilicate is in the form of particles. In general, the particles can be any shape known to one of ordinary skill in the art. Examples of suitable shapes the particles may take include spheres, spheroids, lentoids, ovoids, solid polyhedra such as tetrahedra, cubes, octahedra, icosahedra, dodecahedra, hollow polyhedral (also known as nanocages), stellated polyhedral (both regular and irregular, also known as nanostars), triangular prisms (also known as nanotriangles), hollow spherical shells (also known as nanoshells), tubes (also known as nanotubes), sheets, platelets, disks, rods (also known as nanorods), and mixtures thereof. In the case of nanorods, the rod shape may be defined by a ratio of a rod length to a rod width, the ratio being known as the aspect ratio. For particles of the current invention, nanorods should have an aspect ratio less than 1000, preferably less than 750, preferably less than 500, preferably less than 250, preferably less than 100, preferably less than 75, preferably less than 50, preferably less than 25.

In some embodiments, the particles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of particles having a different shape. As used herein, the term "non-uniform shape" refers to an average consistent shape that differs by more than 10% of the distribution of particles having a different shape. In some embodiments, the shape is uniform and at least 90% of the particles are spherical or substantially circular, and less than 10% are polygonal. In another embodiment, the shape is non-uniform and less than 90% of the particles are spherical or substantially circular, and greater than 10% are polygonal.

In some embodiments, the particles have a mean particle size in a range of 4.5 to 15 μm, preferably 5 to 14.5 μm, preferably 5.5 to 14 μm, preferably 6 to 13.5 μm, preferably 6.5 to 13 μm, preferably 7 to 12.5 μm, preferably 7.5 to 12 μm, preferably 8 to 11.5 μm, preferably 8.5 to 11 μm, preferably 9 to 10.5 μm. In embodiments where the particles are spherical, the particle size may refer to a particle diameter. In embodiments where the particles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the particles have an anisotropic shape such as nanorods, the particle size may refer to a length of the nanorod, a width of the nanorod, an average of the length and width of the nanorod. In some embodiments in which the particles have non-spherical shapes, the particle size refers to the diameter of a sphere having an equivalent volume as the particle. In some embodiments in which the particles have non-spherical shapes, the particle size refers to the diameter of a sphere having an equivalent diffusion coefficient as the particle.

In some embodiments, the particles are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the particles are monodisperse having a particle size distribution ranging from 80% of the average particle size to 120% of the average particle size, preferably 90 to 110%, preferably 95 to 105% of the average particle size. In some embodiments, the particles are not monodisperse.

Because of substitution of lower valence cations, smectite-type clays carry a net negative charge on the clay sheets that may be neutralized by metal cations that are positioned on the surfaces of the clay. For example, due to isomorphous substitution of Mg for Al in the central alumina plane, montmorillonite carries a net negative charge that can attract cations such as sodium and calcium ions. In some embodiments, the smectite-type clay of the present disclosure has exchangeable inorganic cations. Preferably, the exchangeable inorganic cations of the smectite-type clay may be sodium, calcium, potassium, magnesium, or some other cation. Most preferably, the exchangeable cations are sodium, calcium, or both.

As used herein, the term "cation-exchange capacity" ("CEC") refers to the amount of positive charge that can be exchanged per mass of clay. An equivalent unit of milliequivalent per 100 grams (meq/100 g) is centimole per kilogram (cmole/kg), where cmole represents the molar amount of exchangeable positive charge. Measurements of cation-exchange capacity are known to those of ordinary skill in the art. For example, the cation exchange capacity may be determined as the amount of cations that can be ion exchanged with a 1 M solution of ammonium acetate at pH of about 7. In some embodiments, the smectite-clay has a cation-exchange capacity of at least 50 meq of exchangeable cations per 100 grams of the clay, preferably 75 to 300 meq of exchangeable cations per 100 grams of the clay, more preferably 100 to 200 meq of exchangeable cations per 100 grams of the clay, at pH of 6 to 8, 6.5 to 7.5, or about 7.

The synthetic modified phyllosilicate comprises a metal which is at least one selected from the group consisting of ruthenium, rhodium, palladium, osmium, iridium, and platinum. Such elements are typically referred to as "platinum group elements". In preferred embodiments, the metal is palladium.

In some embodiments, the metal is present as cations. The exchangeable inorganic cations of the smectite-type clays may be exchanged with cations. In some embodiments, the exchangeable inorganic cations of the smectite-type clays are exchanged with metal cations selected from the group consisting of ruthenium, rhodium, palladium, osmium, iridium, and platinum. In some embodiments, these metals may be present as cations in substantially similar locations in the synthetic modified phyllosilicate as the exchangeable inorganic cations of the smectite-type clay.

The term "anion" means a negatively charged ion including, but not limited to, halides, such as fluoride, chloride, bromide, and iodide, nitrate, sulfate, phosphate, methanesulfonate, ethanesulfonate, p-toluenesulfonate, salicylate, malate, maleate, succinate, tartrate, citrate, acetate, perchlorate, trifluoromethanesulfonate, acetylacetonate, tetrafluoroborate, hexafluorophosphate, and hexafluoroacetylacetonate. In some embodiments, the metal cation is charge-balance by an anion selected from the group consisting of a hexafluorophosphate ion, a trifluoromethanesulfonate ion, a tetrafluoroborate ion, and a halide ion. In a preferred embodiment, the anion is a halide, such as a chloride, a bromide, a fluoride, and an iodide. Most preferably, the anion is a chloride. In some embodiments, the metal cation is charge balanced by the phyllosilicate material itself.

In some embodiments, the metal is present as metallic particles. In some embodiments, such metallic particles may be of similar size as particles of or present in the phyllosilicate. In general, such metallic particles may be of any suitable size, for example, having a mean particle size from 1 to 10,000 nm, and having any suitable shape as described above. In some embodiments, the metal is present as particles of a metal oxide. In some embodiments, such metal oxide particles may be of similar size as particles of or present in the phyllosilicate. In general, such metal oxide particles may be of any suitable size, for example, having a mean particle size from 1 to 10,000 nm, and having any suitable shape as described above.

In some embodiments, the metal is present in an amount of 1.7 to 2.7 wt %, preferably 1.8 to 2.6 wt %, preferably 1.9 to 2.5 wt %, preferably 2.0 to 2.4 wt %, preferably 2.1 to 2.3 wt %, preferably 2.15 to 2.25 wt %, preferably 2.21 wt %, based on a total weight of XRF-active elements. In some embodiments, the synthetic modified phyllosilicate comprises 60 to 70 wt %, preferably 62 to 69 wt %, preferably 63 to 68 wt %, preferably 64 to 67 wt %, preferably 65 to 66 wt %, preferably 65.5 to 65.75 wt % of Si, based on a total weight of XRF-active elements. In some embodiments, the synthetic modified phyllosilicate comprises 25 to 35 wt %, preferably 26 to 34 wt %, preferably 27 to 33 wt %, preferably 28 to 32 wt %, preferably 29 to 31 wt %, preferably 29.5 to 30 wt % of Mg, based on a total weight of XRF-active elements. In some embodiments, the synthetic modified phyllosilicate comprises 1.8 to 2.8 wt % of Na, based on a total weight of XRF-active elements. As used herein, the term "XRF-active elements" refers to elements which are typically quantifiable by the analysis technique known as X-ray fluorescence. Due to limitations of the technique, elements which are lighter than sodium are typically not able to be efficiently detected or quantified using XRF. As such, the amount of elements such as fluorine, hydrogen, oxygen, and nitrogen are not capable of being included in elemental analysis performed by XRF. Such elements may be referred to as "XRF-inactive" or other similar term. The XRF technique is thus applicable to elements which are sodium or heaver, which can be termed "XRF-active".

In some embodiments, the synthetic modified phyllosilicate of the present disclosure has a water content of less than 12 wt %, preferably less than 10 wt %, more preferably less than 8 wt %, even more preferably less than 6 wt %, for example a water content of 5.5 wt %, 5 wt %, 4 wt %, 3 wt %, or 2 wt %, relative to a total weight of the synthetic modified phyllosilicate.

In some embodiments, the synthetic modified phyllosilicate is present in an amount of 0.05 to 0.2 wt %, preferably 0.06 to 0.18 wt %, preferably 0.07 to 0.16 wt %, preferably 0.08 to 0.14 wt %, preferably 0.09 to 0.13 wt % preferably 0.1 to 0.11 wt %, based on a total weight of the drilling fluid.

The drilling fluid of the present disclosure also comprises a weighting agent. Weighting agents are commonly used to modify the density of drilling fluids. Barite or baryte (barium sulphate) is a typical weighting agent containing barium sulfate ($BaSO_4$), although other minerals may be used. Preferably the weighting agent may be present to produce a desired bulk density in the drilling fluid. In preferred embodiments, the weighting agent comprises barite. Weighting agents other than barite can be used in any of the embodiments described herein. Other weighting agents include minerals such as hematite, magnetite, iron oxides, ilmenite, siderite, celestite, dolomite, olivine, calcite, magnesium oxides, halites, calcium carbonate, strontium sulfate, manganese tetraoxide and the like. Other weighting agents can also be envisioned by those of ordinary skill in the art.

In some embodiments, the weighting agent is present in the drilling fluid in an amount of 45 to 65 wt %, preferably 46 to 64 wt %, preferably 47 to 63 wt %, preferably 48 to 62 wt %, preferably 49 to 61 wt %, preferably 50 to 60 wt %, preferably 51 to 59 wt %, preferably 52 to 58 wt %, preferably 53 to 57 wt %, preferably 54 to 56 wt %, preferably about 55 wt %, based on a total weight of drilling fluid. In some embodiments, a weight ratio of the weighting agent to the synthetic modified phyllosilicate ranges from 250:1 to 750:1, preferably 300:1 to 600:1, preferably 400:1 to 550:1, preferably about 450:1 to 475:1.

In general, the aqueous base fluid may be any water containing solution, including saltwater, hard water, and/or fresh water. For purposes of this description, the term "saltwater" includes saltwater with a chloride ion content of between about 6,000 ppm and saturation, and is intended to encompass seawater and other types of saltwater including groundwater comprising additional impurities typically found therein. The term "hard water" includes water having mineral concentrations between about 2000 mg/L and about 300,000 mg/L. The term "fresh water" includes water sources that comprise less than 6000 ppm, preferably less than 5000 ppm, preferably less than 4000 ppm, preferably less than 3000 ppm, preferably less than 2000 ppm, preferably less than 1000 ppm, preferably less than 500 ppm of salts, minerals, or any other dissolved solids. Exemplary salts that may be present in saltwater, hard water, and/or fresh water include, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite. The water used herein may be supplied from a natural source, such as an aquifer, a lake, and/or an ocean, and may be filtered to remove large solids before being used in the drilling fluid. In some embodiments, the aqueous base fluid comprises an oil phase. In some embodiments, the aqueous base fluid is substantially free of an oil phase. Such phases are typically present in drilling fluids as part of emulsions. In preferred embodiments, the aqueous base fluid is not an emulsion.

The drilling fluid also comprises an inorganic base. The inorganic base may be useful for pH adjustment of the drilling fluid. In some embodiments, the drilling fluid has a pH of 10 to 14, preferably 10.5 to 13, preferably 11 to 12. In some embodiments, the inorganic base is an alkali metal hydroxide.

In some embodiments, the drilling fluid further comprises at least one additive selected from the group consisting of a viscosifier, a fluid-loss control agent, and a bridging agent.

Viscosifiers may also be called "thickeners," and are used to increase the viscosity of a drilling fluid. Exemplary viscosifiers include, but are not limited to, bauxite, bentonite, dolomite, limestone, calcite, vaterite, aragonite, magnesite, taconite, gypsum, quartz, marble, hematite, hectorite, bentonite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, halloysite, xanthan gum (XC-polymer), xanthan gum, guar gum, glycol, carboxymethylcellulose, polyanionic cellulose, and the like. Preferably, the viscosifier is a water-based mud viscosifier. In some embodiments, the viscosifier is bentonite. In some embodiments, the viscosifier is xanthan gum. In some embodiments, the viscosifier is a mixture of bentonite and xanthan gum. Such a mixture may have bentonite and xanthan gum in any suitable ratio, preferably 1:1 to 5:1, preferably 1.5:1 to 4:1, preferably 2:1 to 3.5:1, preferably 2.5:1 to 3:1. In some embodiments, the viscosifier is present in an amount of 0.25 to 1.5 wt %, preferably 0.3 to 1.4 wt %, preferably 0.4 to 1.25 wt %, preferably 0.5 to 1.15 wt %, preferably 0.55 to 1.1 wt %, preferably 0.65 to 1.05 wt %, preferably 0.75 to 1.0 wt %, preferably 0.8 to 0.95 wt %, preferably 0.85 to 0.90 wt %, based on a total weight of drilling fluid.

Fluid-loss control agents limit the loss of drilling fluids into permeable formations. In other words, fluid-loss control agents limit the amount of filtrate that permeates into a permeable formation. Fluid-loss control agents may also be called "fluid loss agents," or "filtration control additives." These include but are not limited to, starch, guar gum, carboxymethyl cellulose, crospovidone, croscarmellose sodium, sodium starch glycolate polysaccharides, polyanionic cellulose polymer, and acrylic polymers such as polyacrylamide, or a clay deflocculant. Starch includes but is not limited to, corn starch, tapioca starch, and potato starch. In some embodiments, the fluid-loss control agent is a polyanionic cellulose polymer. In some embodiments, the fluid-loss control agent is a starch. In some embodiments, the fluid-loss control agent is a mixture of a polyanionic cellulose polymer and a starch. Such a mixture may have a ratio of starch to polyanionic cellulose polymer of 10:1 to 1:1, preferably 9:1 to 2:1, preferably 8:1 to 3:1, preferably 7:1 to 4:1, preferably 6.5:1 to 5:1, preferably 6:1. In some embodiments, the fluid-loss control agent is present in an amount of 0.75 to 1.5 wt %, preferably 0.85 to 1.35 wt %, preferably 0.95 to 1.25 wt %, preferably 1.1 to 1.15 wt %, based on a total weight of the drilling fluid.

In some embodiments, certain additives may have more than one function, or may be grouped with one or more additives. For instance, Xanthan gum may be considered both a viscosifier and a fluid-loss control additive.

The role of the bridging agent may be to insert into the pore openings of a formation and prevent loss of drilling fluid. The bridging agent may be calcium carbonate, other suspended salts, or resins. Preferably the bridging agent is calcium carbonate ($CaCO_3$). In some embodiments, the bridging agent is present in an amount of 0.25 to 1.25 wt %, preferably 0.5 to 1.0 wt %, preferably 0.6 to 0.9 wt %, preferably 0.75 to 0.80 wt %, based on a total weight of drilling fluid.

A clay stabilizer may be used. In some embodiments, the clay stabilizer is potassium chloride. In some embodiments, the clay stabilizer is present in an amount of 2.5 to 3.75 wt %, preferably 2.6 to 3.6 wt %, preferably 2.75 to 3.5 wt %, preferably 3 to 3.25 wt %, preferably 3.1 to 3.2 wt %, based on a total weight of drilling fluid.

The drilling fluid of the present disclosure may optionally comprise any number of additional additives. Examples of additional additives include, without limitation, defoamers, antiscalants, deflocculants, lubricants, gelling agents, corrosion inhibitors, rheology control modifiers or thinners, high temperature/high pressure control additives, acids, alkalinity agents, pH buffers, fluorides, gases, nitrogen, carbon dioxide, surface modifying agents, tackifying agents, foamers, catalysts, clay control agents, biocides, bactericides, friction reducers, antifoam agents, dispersants, flocculants, $H_2S$ scavengers, $CO_2$ scavengers, oxygen scavengers, friction reducers, breakers, relative permeability modifiers, resins, particulate materials (e.g., proppant particulates), wetting agents, coating enhancement agents, filter cake removal agents, odorants, shale stabilizers, oils, and the like. One or more of these additives may comprise degradable materials that are capable of undergoing irreversible degradation downhole. A person skilled in the art, with the benefit of this disclosure, will recognize the types of additives that may be included in the drilling fluid for a particular application, without undue experimentation.

The drilling fluid may be prepared by any suitable means known in the art. In some embodiments, the drilling fluid may be prepared at a well site or at an offsite location. Once prepared, the drilling fluid may be placed in a tank, bin, or other container for storage and/or transport to the site to use. In other embodiments, the drilling fluid may be prepared on-site, for example, using continuous mixing, on-the-fly mixing, or real-time mixing methods. In certain embodiments, these methods of mixing may include methods of combining two or more components wherein a flowing stream of one element is continuously introduced into flowing stream of another component so that the streams are combined and mixed while continuing to flow as a single stream as part of the ongoing treatment. In some embodiments, the drilling fluid may be made by a specific order of adding and mixing components. For instance, the synthetic modified phyllosilicate may be added before the bridging agent. In some embodiments, mixing may proceed for a period of 1 to 30 minutes, 5 to 20 minutes, or about 10 minutes following the addition of each component, or similar components (for instance two fluid-loss control agents may be added simultaneously while mixing). In some embodiments, the drilling fluid may be formed by mixing the components shown in Table 1.

In some embodiments, the drilling fluid of the present disclosure has a density in a range of 12 to 18 pounds per gallon (ppg), preferably 13 to 17 ppg, preferably 13.5 to 16.5 ppg, preferably 14 to 16 ppg, preferably 14.5 to 15 ppg. This density may be obtained at a temperature in a range of 60 to 400° F., preferably 80 to 300° F., preferably 100 to 200° F.

Generally, increased viscosity leads to improved suspension of weighting agents which in turn limits or reduces problematic "sag." However, excessive viscosity can have adverse effects on equivalent circulating density (causing it to increase), which can also lead to problems, particularly in wells where the differences in subterranean formation pore pressures and fracture gradients are small, as commonly encountered in deep water wells.

Under certain well conditions, including without limitation, well geometries, temperatures, and pressures, a phenomenon called "barite sag" or "sag" can occur. "Sag" is generally a significant variation in mud density (>0.5 lbm/gal) along the mud column, which is the result of settling of the weighting agent or weight material and other solids in the drilling fluid. Sag generally results from the inability of the drilling fluid under the particular well conditions to provide adequate suspension properties. Sag may result in formation of a bed of the weighting agents on the low side of the wellbore, and stuck pipe, among other things. In some cases, sag may be deleterious to a drilling operation and lead to hole abandonment.

As described herein, the "sag factor" is the ratio of the bottom density to the sum of the top and bottom densities, each of the same volume of drilling fluid and following a certain time period of aging. "Sag" generally refers to the tendency of a weighting agent to migrate or settle to the bottom, causing an increase in the sag factor. Suspensions of solids in non-vertical columns are known to settle faster than suspensions in vertical ones. This effect is driven by gravity and impeded by fluid rheology, particularly non-Newtonian and time dependent rheology.

A sag factor of exactly 0.5 refers to no difference in top and bottom densities (for both vertical and non-vertical columns), and thus no sag tendency. Some amount of sag is considered acceptable, for instance, drilling fluids that show a sag factor in a range of 0.50 to 0.53 after aging.

In some embodiments, the sag factor may be measured from a column of fluid having a length of about 11 cm. In some embodiments, column of fluid may be housed in an aging cell with a headspace of about 2 cm. For a vertical sag factor measurement, the top density may be measured about 1 cm below the fluid surface, and the bottom density may be measured about 10 cm below the fluid surface (or about 1 cm from the bottom of the column). For an inclined sag factor measurement, the top density may be measured about 1 cm directly below the fluid surface, or 1 cm below the fluid surface parallel to a sidewall of the aging cell. Similarly, the bottom density for an inclined cell may be measured 10 cm below the fluid surface parallel to a sidewall of the aging cell.

Drilling fluids in deviated wellbores can exhibit sag in both static and dynamic situations. In this context, static is a totally quiescent fluid state, such as when drilling has ceased; dynamic is any situation where the fluid is exposed to a shear stress, such as for example during drilling. As used hereinafter, the term "sag" shall be understood to include both static and dynamic sag unless specifically indicated otherwise. In some embodiments, the sag described here is static, meaning that the sag is measured on a drilling fluid in an aging cell not exposed to shear stress. Alternatively, dynamic sag is measured in an aging cell with an applied shear stress.

In some embodiments, the drilling fluid has a static sag factor in a range of 0.480 to 0.525, preferably 0.485 to 0.520, preferably 0.490 to 0.515, preferably 0.4925 to 0.5125, preferably 0.495 to 0.510, preferably 0.4975 to 0.5075, preferably 0.500 to 0.505 at a vertical condition, at a temperature of 175 to 325° F., preferably 200 to 300° F., preferably 225 to 275° F., preferably 230 to 270° F., preferably 240 to 260° F., preferably 250° F., and a pressure of 300 to 800 psi, preferably 400 to 700 psi, more preferably 450 to 650 psi, or about 500 psi. This sag factor may be measured after aging the drilling fluid at the previously described temperature and pressure conditions for a time period of 6 to 96 h, preferably 12 to 48 h, more preferably 18 to 36 h, or about 24 h. In some embodiments, with the above conditions, the sag factor is 95% or less, preferably 92% or less, more preferably 90% or less, or 87% or less, or 85% or less of a sag factor of a substantially similar drilling fluid that does not comprise the synthetic modified phyllosilicate.

As described herein, the "inclined position" means that the aging cell or other vessel containing the drilling fluid, is positioned at an angle in a range of 30 to 60°, preferably 35 to 55°, more preferably 40 to 50°, or about 45° from the vertical.

In some embodiments, the drilling fluid at an inclined position has a static sag factor in a range (or most preferably, in a range of 0.480 to 0.525, preferably 0.490 to 0.520, preferably 0.495 to 0.5175, preferably 0.500 to 0.515, preferably 0.505 to 0.5125 preferably 0.510), at a temperature of 175 to 325° F., preferably 200 to 300° F., preferably 225 to 275° F., preferably 230 to 270° F., preferably 240 to 260° F., preferably 250° F., and a pressure of 300 to 800 psi, preferably 400 to 700 psi, more preferably 450 to 650 psi, or about 500 psi. This sag factor may be measured after aging the drilling fluid at the previously described temperature and pressure conditions for a time period of 6 to 96 h, preferably 12 to 48 h, more preferably 18 to 36 h, or about 24 h. In some embodiments, with the above conditions, the sag factor is 95% or less, preferably 92% or less, more preferably 90% or less, or 87% or less, or 85% or less of a sag factor of a substantially similar drilling fluid that does not comprise the synthetic modified phyllosilicate.

In some embodiments, the drilling fluid has a dynamic sag factor in a range of 0.05 to 1.5 ppg, preferably 0.075 to 1 ppg, preferably 0.10 to 0.5 ppg, preferably 0.125 to 0.25 ppg, preferably 0.15 to 0.20 ppg, preferably 0.16 to 0.18 ppg, preferably 0.17 ppg with a shear rate of 50 to 200 rpm, 75 to 150 rpm, 90 to 110 rpm, or about 100 rpm, at a temperature of 80 to 250° F., preferably 90 to 200° F., more preferably 100 to 150° F., or about 120° F., and a pressure of 0.8 to 2 atm, 0.9 to 1.5 atm, or about 1 atm. The dynamic sag factor may be measured on a Fann® rheometer. In some embodiment, with the above conditions, the dynamic sag factor is 50% or less, preferably 45% or less, preferably 40% or less, preferably 36% or less, preferably 30% or less, preferably 25% or less, preferably 20% or less, preferably 15% or less, preferably 10% or less of a dynamic sag factor of a substantially similar drilling fluid that does not comprise the synthetic modified phyllosilicate.

As used herein, the term "gel strength" refers to the shear stress measured at a low shear rate after a drilling fluid has set quiescently for a set period of time. According to standard API procedures, the gel strength is measured after setting for 10 seconds and 10 minutes, although measurements at longer time intervals can also be made such as, for example, 30 minutes or 16 hours.

In some embodiments, the drilling fluid has a ten-second gel strength of 20 to 32 lb/100 ft$^2$, preferably 22-30 lb/100 ft$^2$, preferably 24-28 lb/100 ft$^2$, preferably about 27 lb/100 ft$^2$, a ten-minute gel strength of 50 to 95 lb/100 ft$^2$, preferably 60 to 92.5 lb/100 ft$^2$, preferably 70 to 90 lb/100 ft$^2$, preferably 72 to 88 lb/100 ft$^2$, and a thirty-minute gel strength of 60 to 110 lb/100 ft$^2$, preferably 70 to 105 lb/100 ft$^2$, preferably 80 to 100 lb/100 ft$^2$, preferably 88 to 98 lb/100 ft$^2$. These gel strengths may be measured at a temperature of 175 to 325° F., preferably 200 to 300° F., preferably 225 to 275° F., preferably 230 to 270° F., preferably 240 to 260° F., preferably 250° F.

As used herein, the term "yield point" refers to a parameter of the Bingham plastic model, where yield point refers to the yield stress extrapolated to a shear rate of zero. In some embodiments, the drilling fluid has a yield point in a range of 35 to 55 lb/100 ft$^2$, preferably 40 to 52.5 lb/100 ft$^2$, more preferably 45 to 50 lb/100 ft$^2$, preferably about 48 lb/100 ft$^2$, at a temperature of 175 to 325° F., preferably 200 to 300° F., preferably 225 to 275° F., preferably 230 to 270° F., preferably 240 to 260° F., preferably 250° F.

"Plastic viscosity" (PV) is another parameter of the Bingham plastic model, which represents the slope of the shear stress/shear rate line above the yield point. In some embodiments, the drilling fluid has a plastic viscosity of 35 to 40 cP, preferably 36 to 39 cp, preferably 36.5 to 38.5 cp, preferably 37 to 38 cp, at a temperature of 175 to 325° F., preferably 200 to 300° F., preferably 225 to 275° F., preferably 230 to 270° F., preferably 240 to 260° F., preferably 250° F.

Preferably, the presence of the synthetic modified phyllosilicate does not significantly affect filtration performance. In some embodiments, the drilling fluid has a filtrate volume that is within 20%, preferably 18%, preferably 17%, preferably 15%, preferably 12%, within 10%, preferably within 8% of the filtrate volume of a substantially similar drilling fluid that does not have the synthetic modified phyllosilicate and is subjected to the same filtration conditions. In some embodiments, the drilling fluid has a filtrate thickness that is within 21%, preferably with 18%, more preferably within 17% of the filtrate thickness of a substantially similar drilling fluid that does not have the synthetic phyllosilicate and is subjected to the same filtration conditions. In some embodiments, the drilling fluid has a filtrate cake weight that is within 21%, preferably with 18%, more preferably within 17% of the filtrate cake weight of a substantially similar drilling fluid that does not have the synthetic modified phyllosilicate and is subjected to the same filtration conditions. In some embodiments, these filtration conditions may involve a pressure difference in a range of 50 to 750 psi, preferably 75 to 650 psi, more preferably 100 to 500 psi, preferably 200 to 400 psi, or about 300 psi. A median pore size of the permeable formation or of the filtration medium may be in a range of 1 to 60 µm, 10 to 50 µm, preferably 20 to 40 µm. In one embodiment, the filtrate volume, thickness, and filtrate cake weight may be measured after a filtration time period in a range of 10 to 60 minutes, 15 to 50 minutes, or 20 to 40 minutes, or about 30 minutes.

According to a second aspect, the present disclosure relates to a method of drilling a subterranean geological formation. The method involves driving a drill bit to form a wellbore in the subterranean geological formation and injecting the drilling fluid of the first aspect in any of its embodiments into the subterranean geological formation through the wellbore. The synthetic modified phyllosilicate prevents sagging of the weighting agent in the wellbore. In one embodiment, the wellbore is a vertical wellbore, a horizontal wellbore, a multilateral wellbore, or an extended reach wellbore. A pumping system may be used to circulate the drilling fluid in the wellbore during the drilling.

The drilling fluid may be used during or in conjunction with other operations, such as pre-flush treatments, after-flush treatments, hydraulic fracturing treatments, sand control treatments (e.g., gravel packing), "frac pack" treatments, acidizing treatments (e.g., matrix acidizing or fracture acidizing), wellbore clean-out treatments, cementing operations, workover treatments/fluids, and other operations where the drilling fluid may be useful. In this sense, the drilling fluid may also be considered a completion or workover fluid.

The examples below are intended to further illustrate protocols for preparing and characterizing the drilling fluid and uses thereof, and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

EXAMPLES

Figure 1:
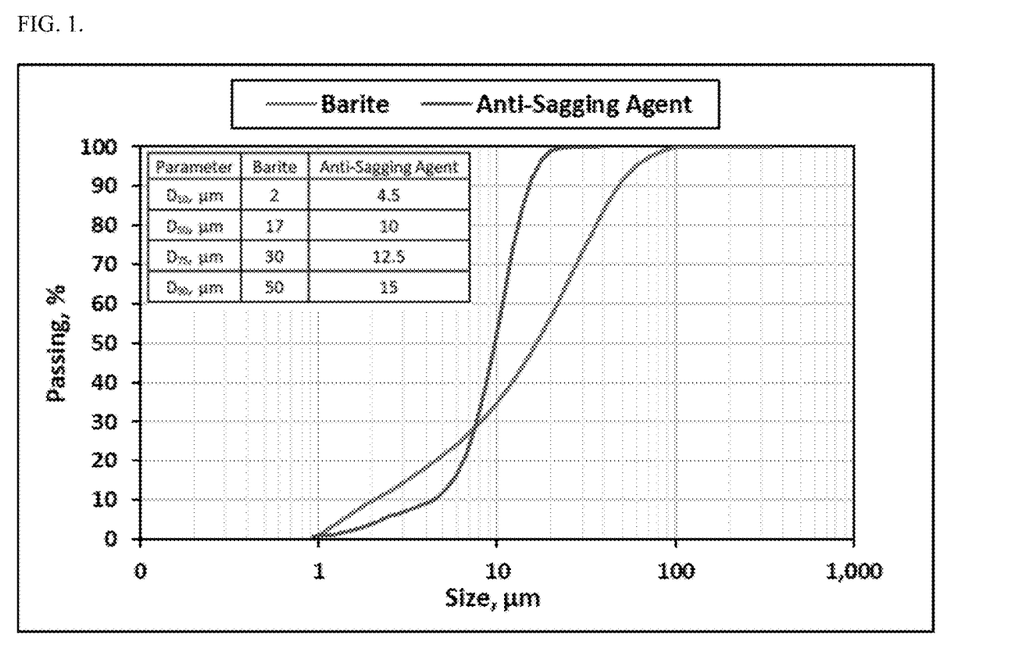
FIG. 1 is a plot of the particle size distribution of barite and anti-sagging agent.

A sample of commercial barite with an average particle size of 17 microns was used as a weighting material for water-based drilling fluid. The barite sample mainly contains 75.1 wt. % barium, 17.5 wt. % sulfur, and some other impurities. Some additives were used to formulate the drilling fluid. Soda ash was used to maintain the level of calcium in the water. Bentonite and xanthan gum polymer were used as viscosifiers to enhance the rheological properties of the drilling fluid. Starch and PAC-R were used to control fluid loss. Clay stabilization was maintained by adding potassium chloride to the drilling fluid. Calcium carbonate was used as bridging agent [Caenn, R., Darley, H. C. H., Gray, G. R., 2011. Composition and Properties of Drilling and Completion Fluids, six. Ed. Gulf Professional Publishing; The Boulevard: Oxford, UK, Chapter 11; p. 535, incorporated herein by reference in its entirety]. Table 1 shows the drilling fluid formulation used. A new additive was added in different concentrations as an anti-sagging agent to enhance the stability of the drilling fluid and prevent solid settlement. This additive is a synthetic modified phyllosilicate. The new agent is a powder with an average particle size of 10 microns. It mainly contains 65.65 wt. % silicon, 29.82 wt. % magnesium, 2.32 wt. % sodium, and 2.21 wt. % palladium. Table 2 lists the elemental composition of the barite sample and the anti-sagging agent that was obtained using X-ray fluorescence technique (XRF). The particle size distribution of barite sample and anti-sagging agent is shown in FIG. 1.

TABLE 1

Drilling fluid formulation

| Additive | Amount, g | Mixing Time, min | Function |
| --- | --- | --- | --- |
| Water | 245 | — | Base |
| Defoamer | 0.08 | 1 | Anti-foam agent |
| Soda ash | 0.5 | 1 | Maintain calcium concentration |
| Xanthan gum polymer | 1.5 | 20 | Viscosity control |
| Bentonite | 4 | 10 | Viscosity control |
| Laponite | 0-0.75 | 10 | Anti-sagging additive |
| Potassium hydroxide | 0.5 | 1 | pH adjustment |

TABLE 1-continued

Drilling fluid formulation

| Additive | Amount, g | Mixing Time, min | Function |
|---|---|---|---|
| Starch | 6 | 10 | Fluid loss control |
| Pac-R | 1 | 10 | Fluid loss control |
| Potassium chloride | 20 | 10 | Clay stabilization |
| Calcium carbonate | 5 | 10 | Bridging agent |
| Barite | 350 | 10 | Weighting material |

TABLE 2

Elemental composition of barite and anti-sagging agent determined using XRF

| | wt. % | |
|---|---|---|
| Element | Barite | Anti-Sagging Agent |
| Ba | 75.11 | — |
| S | 17.15 | — |
| Si | 5.6 | 65.65 |
| Al | 2.12 | — |
| Mg | — | 29.82 |
| Na | — | 2.32 |
| Pd | — | 2.21 |

Fluid Preparation and Rheology Measurements

A basic barite-weighted drilling fluid, 14.8 ppg, was prepared using basic drilling fluid additives. Water was added with a ratio of 0.7 bbl (245 g in laboratory units) and poured in the drilling fluid mixer container. Defoamer and soda ash were added to prevent the formation of foam and to maintain the level of calcium in water, respectively. Then, other additives were added and mixed for specific time starting by viscosity control agents, bentonite and xanthan polymer. The mixing started with low rotational speed then the speed was increased gradually as the viscosity built up. Table 1 lists all drilling fluid additives, their amounts and functions, and the mixing time. Following the same procedure, several samples of drilling fluid were prepared by adding different ratios of the new additive to the basic drilling fluid formulation (0.5 g and 0.75 g). The anti-sagging additive was added right before adding the weighting material and mixed for 5 minutes. After fluid preparation, fluid density was measured using a mud balance, pH was measured using a pH meter, and the rheological properties were measured at 120° F. using OFITE 900-Viscometer to study the effect of adding the new additive on drilling fluid rheology at that conditions.

Sag Tests

Figure 2A:
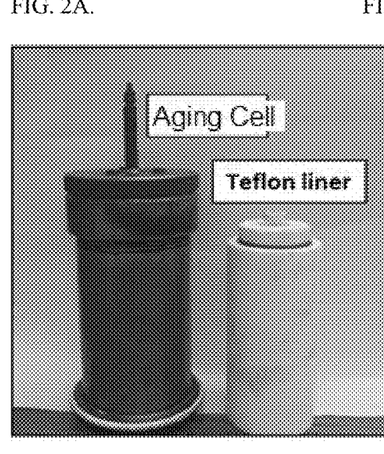
FIGS. 2A-2B are photographs showing the experimental setup for the static sag test in the vertical (FIG. 2A) and inclined (FIG. 2B) orientations.
Figure 2B:
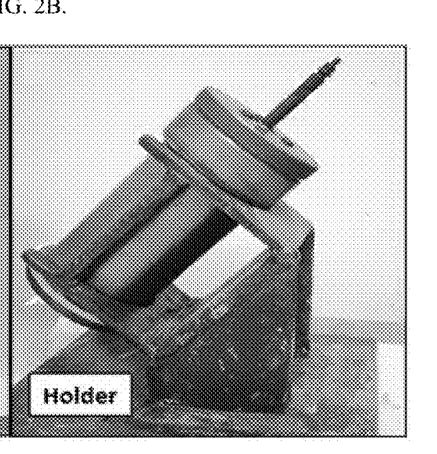

The static sag test was conducted to study the effect of adding the new additive on barite sag tendency at static conditions. First, drilling fluid sample was agitated using drilling fluid mixer. An aging cell was used to contain and keep the fluid pressurized. A pressure of 500 psi was applied using nitrogen to prevent fluid from evaporation and the aging cell was kept in the oven for 24 hours at specific temperature and static conditions. Static sag test was conducted at both vertical and inclined condition (45 degrees). After 24 hours, the cell was taken out and left to cool down and the pressure was released. Afterwards, two fluid samples were taken from the top and the bottom of the cell. The densities of the two samples were measured and the sag factor was calculated using Equation 1. The fluid that has a sag factor between 0.5 and 0.53 will have a good sag performance while a sag factor greater than 0.53 will result in a bad sag performance, and solid particles settlement is likely [Alabdullatif, Z., Al-yami, A., Wagle, V., Bubshait, A., Al-safran, A., Aramco, S., 2015. Development of New Kill Fluids with Minimum Sagging Problems for High Pressure Jilh Formation in Saudi Arabia. Saudi Aramco J. Technol.; and Maxey, J., 2007. Rheological Analysis of Static and Dynamic Sag in Drilling Fluids. Annual Transactions of The Nordic Rheology Society, 15, each of which is incorporated herein by reference in its entirety]. FIG. 2 shows sag test setup for vertical and inclined conditions.

$$\text{Sag Factor} = \frac{\rho_{Bottom}}{\rho_{Bottom} + \rho_{Top}} \quad (1)$$

where, $\rho_{Bottom}$=Bottom density, ppg and $\rho_{Top}$=Top density, ppg

Figure 3:
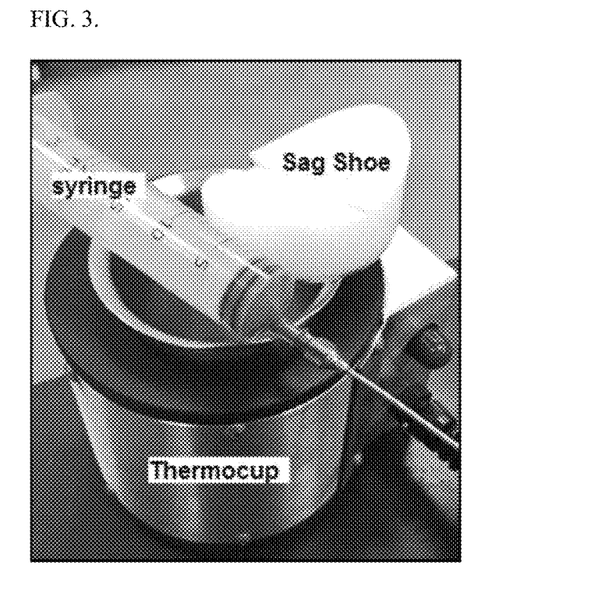
FIG. 3 is a photograph showing an experimental setup for dynamic sag test.

Sag tendency of drilling fluid samples was evaluated under dynamic conditions using viscometer sag shoe test, VSST. The test was conducted at standard conditions, i.e. atmospheric pressure and 120° F. FIG. 3 shows the experimental setup used to conduct dynamic sag test. The procedure followed to conduct the test as follows:

Sag show was put in the bottom of the cup and drilling fluid sample (140 mL) was poured in the cup.

Fluid sample was heated until reached 120° F. and viscometer was run at 100 RPM (revolution per minute).

Then, a 10 mL-sample was collected from the collection well in the bottom of the sag shoe using a syringe with cannula and the weight was recorded (W1).

After 30 minutes, the viscometer was stopped, and another sample was taken from the bottom and weighted (W2).

Dynamic sag factor (VSST) was calculated in ppg using Equation 2.

$$\text{VSST} = 0.834(W_2 - W_1) \quad (2)$$

A drilling fluid that has a VSST value equal or less than 1.0 ppg will exhibit a good performance and solids sag is unlikely to occur while, a VSST value more than 1.6 ppg reflects a bad sag performance and solids sag is highly anticipated [Aldea, C., Growcock, F. B., Lee, L. J., Friedheim, J. E., and Oort, E. V., 2001. Prevention of Dynamic Sag in Deepwater Invert Emulsion Fluids. Paper presented at AADE 2001 National Drilling Conference, 'Drilling Technology', Texas, 27-29 March; and Bern, P. A., Zamora, M., Hemphill, A. T., Marshall, D., Omland, T. H., and Morton, E., 2010. Field Monitoring of Weight-Material Sag. Paper presented at the AADE Fluids Conference and Exhibition, Texas, USA, 6-7 April, each of which is incorporated herein by reference in its entirety].

HPHT Filtration Experiments

Drilling fluid samples were agitated for 10 minutes then poured in the filtration cell to investigate the effect of the new additive on the filtration performance of the drilling fluid. The filtration experiments were performed at 250° F. and 300 psi differential pressure, using 10-micron ceramic filter disc. The cell was heated up to 250° F. under a pressure of 300 psi that was applied using nitrogen gas. Then, the experiments were started, and the filtrate volume was recorded with time. The experiments were run for 30 minutes. Afterwards, the filter cake was characterized by measuring the weight and the thickness. Table 3 summarizes filtration experiments conditions.

TABLE 3

Filtration experiment conditions

| Parameter | Description |
| --- | --- |
| Fluid volume | 350 cm³ |
| Pressure | 300 psi |
| Temperature | 250° F. |
| Experiment duration | 30 min |
| Ceramic filter disc | 10-micron |

Figure 4:
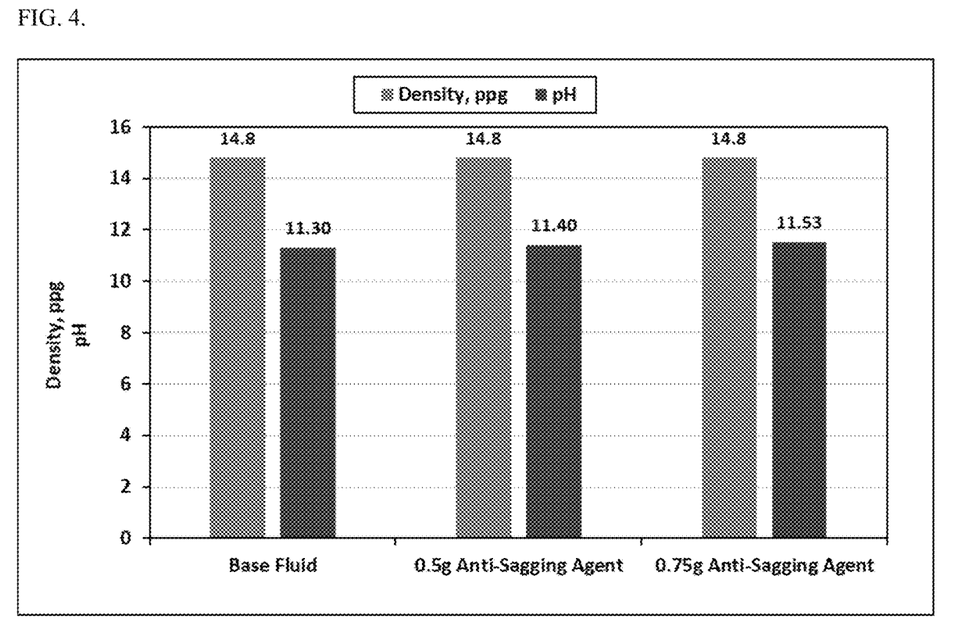
FIG. 4 is a plot of the density for the base fluid and drilling fluids containing 0.5 g and 0.75 g of the anti-sagging agent.

After fluid preparation, the density and pH of the drilling fluid samples were measured. FIG. 4 compares the density and the pH of the base fluid and with 0.5 g and 0.75 g of the anti-sagging agent. It was found that the new anti-sagging agent had no impact on the drilling fluid density and pH and the density and pH, for all the drilling fluid samples, were 14.8 ppg and around 11.4, respectively.

Figure 5:
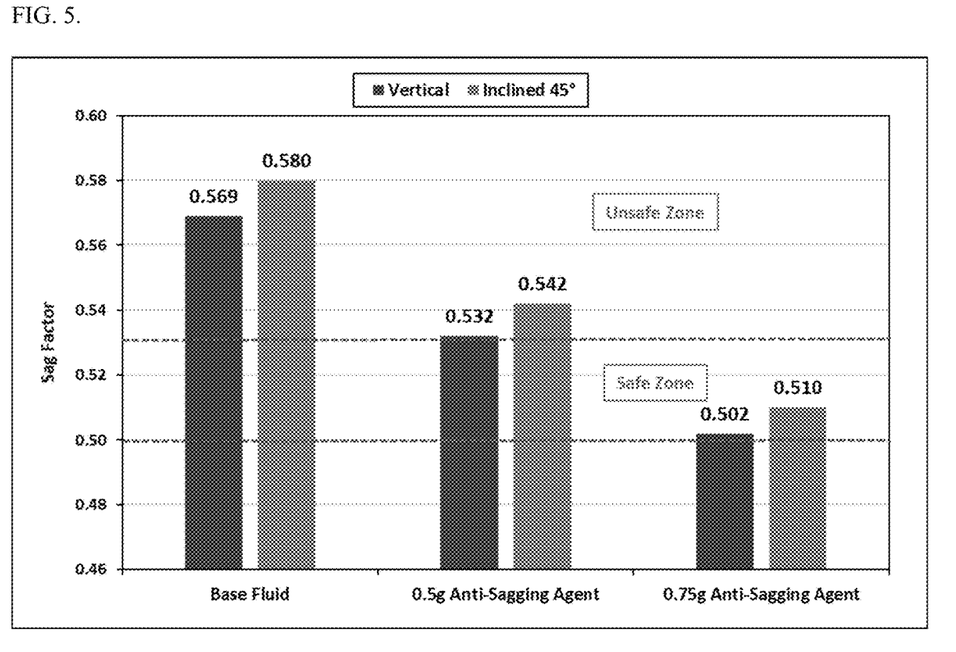
FIG. 5 is a plot of the static sag factor for the base fluid and drilling fluids containing 0.5 g and 0.75 g of the anti-sagging agent.

FIG. 5 shows the sag performance of the drilling fluid samples under vertical and inclined static conditions at 250° F. For inclined sag test, the degree of inclination was set at 45° to simulate the worst scenario because the settling process is accelerated when the inclination is above 30° [Skalle, P., Backe, K. R., Lyomov, S. K., Sveen, J., 1999. Barite Segregation in Inclined Boreholes. Journal of Canadian Petroleum Technology, 38(13), 1-6, incorporated herein by reference it its entirety]. The base fluid showed bad sag performance at 250° F., and the sag factor was much higher than 0.53 for both cases therefore, barite sag is likely. Then, the new additive was added to the drilling fluid formulation with different concentrations, 0.5 g and 0.75 g, and the sag test was performed at 250° F. for both vertical and inclined conditions. As shown in FIG. 5 adding the new additive to the drilling fluid formulation showed a significant enhancement on stability and the sag factor at vertical and inclined conditions was reduced to reach 0.502 and 0.51, respectively, when adding 0.75 g of the anti-sagging agent which is within the safe range for sag factor (0.5-0.53) therefore, barite sag is unlikely to occur at that conditions.

Figure 6:
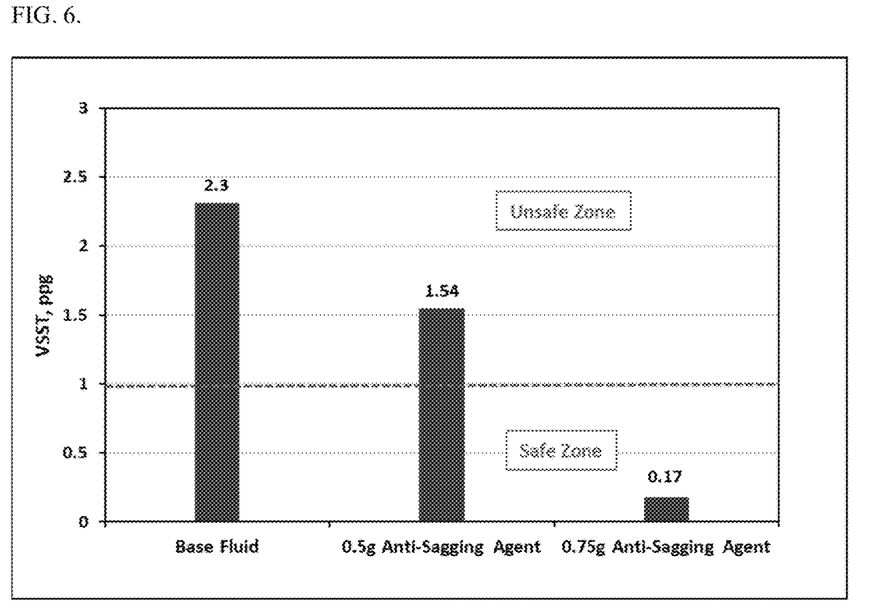
FIG. 6 is plot of the dynamic sag tendency for the base fluid and drilling fluids containing 0.5 g and 0.75 g of the anti-sagging agent.

Similarly, the base drilling fluid sample exhibited a bad sag performance under dynamic conditions with a VSST of 2.3 which is much higher than the acceptable value (≤1). As shown in FIG. 6, adding the new anti-sagging agent improved the sag tendency of the drilling fluid at dynamic conditions and significantly reduced the VSST value to reach 0.17 when adding 0.75 g of the anti-sagging agent. Since adding only 0.75 g of the anti-sagging agent to the drilling fluid formulation prevented barite sag under both static and dynamic conditions, 0.75 g can be considered as the optimum concentration and no need to go for higher concentrations because as the concentration increased, more cost will be added to the drilling operation.

Figure 7:
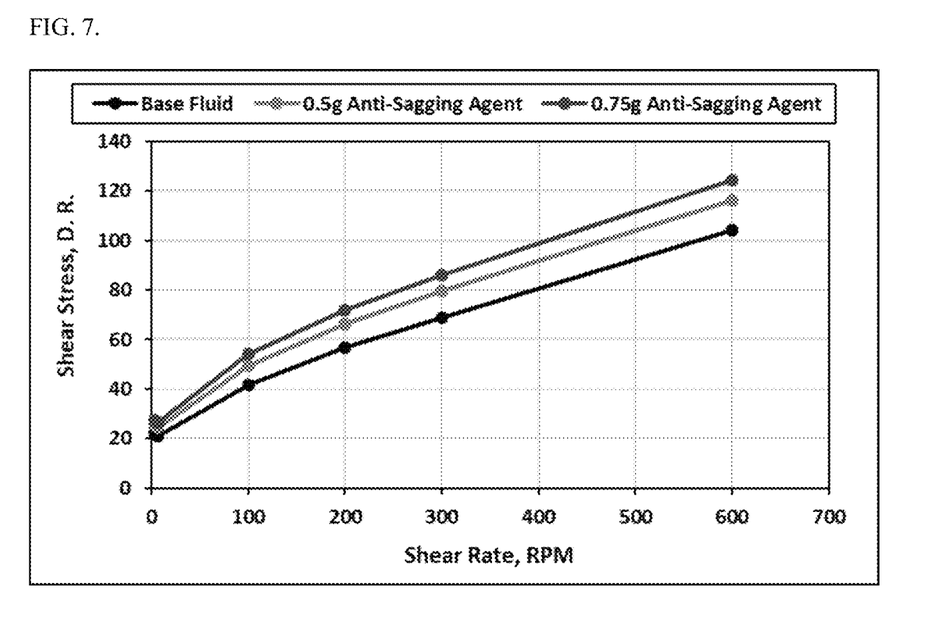
FIG. 7 is a plot of the shear stress vs shear rate for the base fluid and drilling fluids containing 0.5 g and 0.75 g of the anti-sagging agent.
Figure 8:
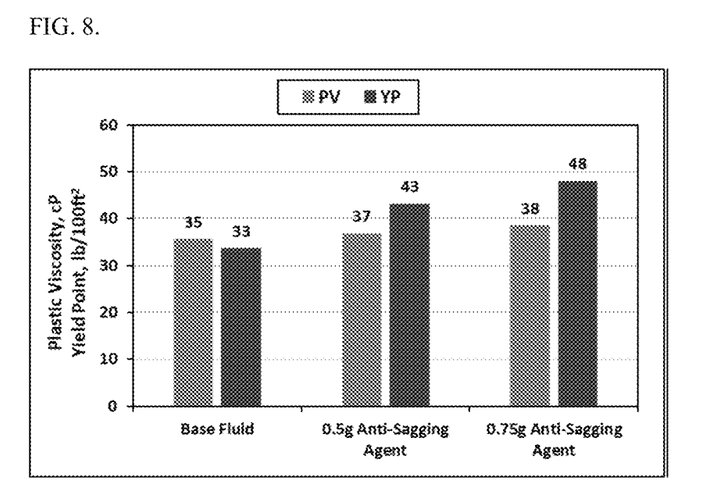
FIG. 8 is a plot of the plastic viscosity and yield point for the base fluid and drilling fluids containing 0.5 g and 0.75 g of the anti-sagging agent.

The shear stress that measured at 120° F. was plotted versus the shear rate for all drilling fluid samples, FIG. 7. It was found that adding the new additive to the drilling fluid shifted the consistency curve upward while the slope remained almost constant which indicates a significant increase in yield point (intercept with y-axis) without increasing the plastic viscosity (slope). FIG. 8 compares the rheological properties of all drilling fluid samples measured at 120° F. These properties are yield point, plastic viscosity, and gel strength after 10 s, 10 min, and 30 min. A significant increase in yield point and gel strength was observed as the concentration increased reflecting an enhancement on drilling fluid ability to suspend solid particles, while no significant increase in the plastic viscosity was observed thus, no additional frictional pressure losses during circulation will be added.

Figure 9:
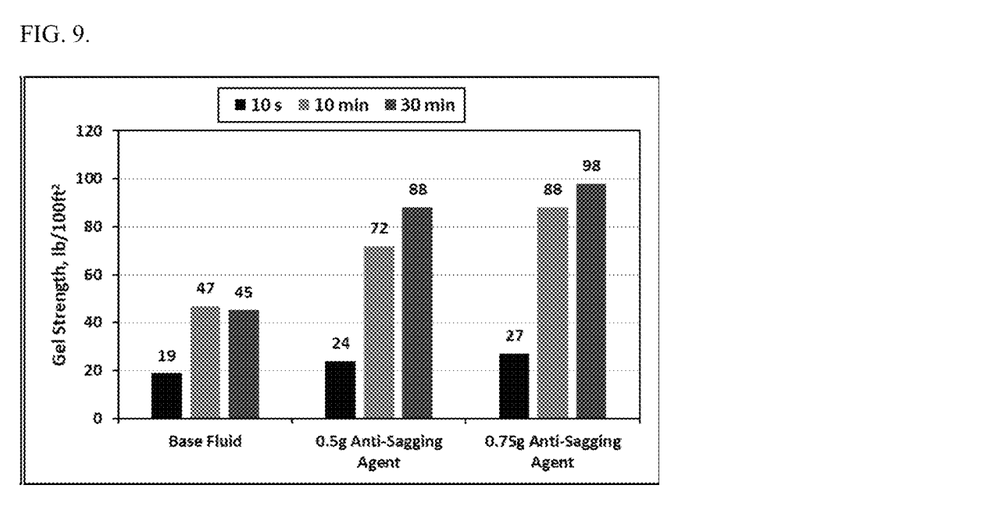
FIG. 9 is a plot of the gel strength for the base fluid and drilling fluids containing 0.5 g and 0.75 g of the anti-sagging agent.
Figure 10:
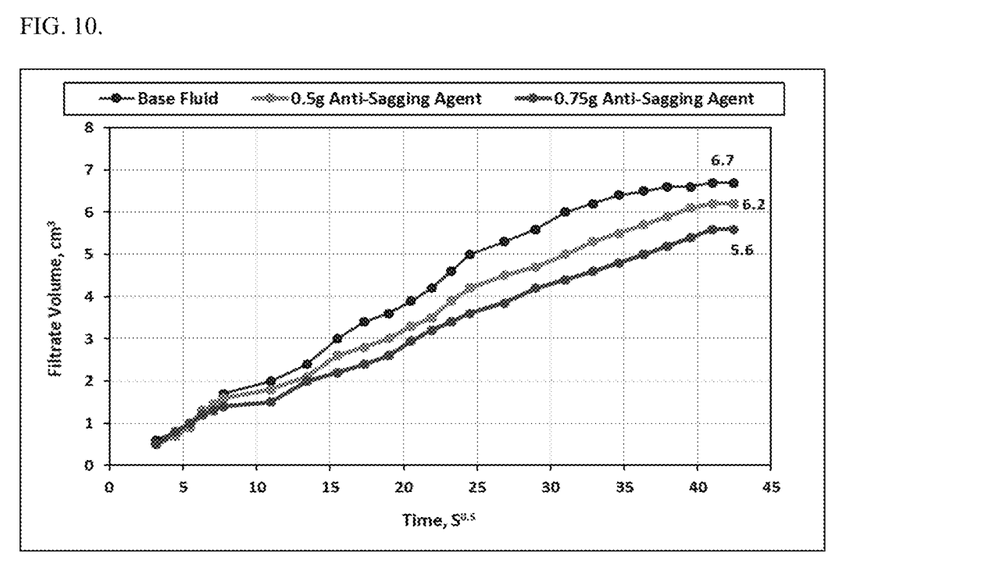
FIG. 10 is a plot of the filtrate volume as a function of time for the base fluid and drilling fluids containing 0.5 g and 0.75 g of the anti-sagging agent.
Figure 11A:
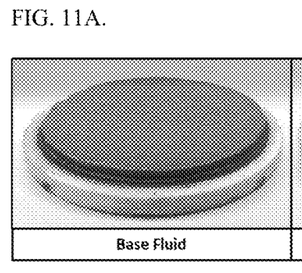
FIGS. 11A-11C are photographs of filter cakes formed from the base fluid (FIG. 11A), a drilling fluid containing 0.5 g of the anti-sagging agent (FIG. 11B), and 0.75 g of the anti-sagging agent (FIG. 11C).
Figure 11B:
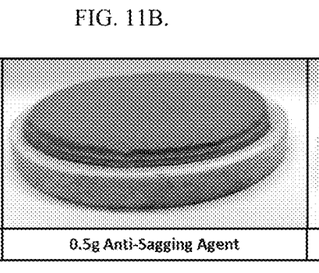
Figure 11C:
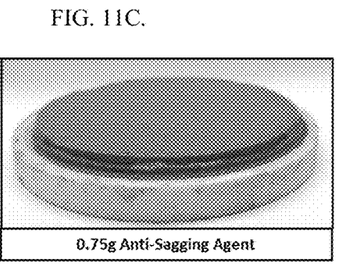

FIG. 9 compares the filtration performance of base drilling fluid and with 0.5 g and 0.75 g of the anti-sagging agent. The filtration experiments were performed at 250° F. and 300 psi differential pressure and run for 30 minutes. It was found that adding the new additive to the drilling fluid formulation improved the filtration performance of the drilling fluid. Adding 0.75 g of the anti-sagging agent reduced the total fluid filtrate volume from 6.7 cm³ to 5.6 cm³, the filter cake weight from 24.9 g to 20.3 g, and the filter cake thickness from 3.71 mm to 2.95 mm, Table 5. FIG. 10 shows the formed filter cake after the filtration test. Table 4 summarizes the filtration experiment results.

TABLE 4

Filtration experiment results summary

| Parameter | Base fluid | 0.5 g Anti-Sagging Agent | 0.75 g Anti-Sagging Agent |
| --- | --- | --- | --- |
| Filtrate volume, cm³ | 6.7 | 6.2 | 5.6 |
| Filter cake weight, g | 24.92 | 22.94 | 20.34 |
| Filter cake thickness, mm | 3.71 | 3.35 | 2.95 |

The invention claimed is:

1. A drilling fluid, comprising:
an aqueous base fluid,
an inorganic base,
a weighting agent comprising barite, and
a synthetic modified phyllosilicate present in an amount of 0.05 to 0.2 wt % based on a total weight of the drilling fluid,
wherein:
the synthetic modified phyllosilicate comprises
60 to 70 wt % of Si,
25 to 35 wt % of Mg,
1.8 to 2.5 wt % of Na, and
1.7 to 2.7 wt % of a metal which is at least one selected from the group consisting of ruthenium, rhodium, palladium, osmium, iridium, and platinum, each relative to a total weight of XRF-active elements present in the synthetic modified phyllosilicate.

2. The drilling fluid of claim 1, wherein the metal is palladium.

3. The drilling fluid of claim 1, wherein the synthetic modified phyllosilicate is a synthetic modified smectite-type clay.

4. The drilling fluid of claim 1, wherein the synthetic modified phyllosilicate is in the form of particles with an average particle size in a range of 4.5 to 15 μm.

5. The drilling fluid of claim 1, wherein the drilling fluid has a pH of 10 to 14, and wherein the inorganic base is an alkali metal hydroxide.

6. The drilling fluid of claim 1, wherein the aqueous base fluid is substantially free of an oil phase, and further comprising at least one selected from the group consisting of a viscosifier, a fluid-loss control agent, a clay stabilizer, and a bridging agent.

7. The drilling fluid of claim 6, wherein the viscosifier is at least one selected from the group consisting of bentonite and xanthan gum.

8. The drilling fluid of claim 6, wherein the fluid-loss control agent is at least one selected from the group consisting of starch and a polyanionic cellulose polymer.

9. The drilling fluid of claim 6, wherein the clay stabilizer is potassium chloride.

10. The drilling fluid of claim 6, wherein the bridging agent is calcium carbonate.

11. The drilling fluid of claim 1, which has a density of 12 to 18 ppg.

12. The drilling fluid of claim 1, which has a static sag factor in a range of 0.480 to 0.525 at a vertical condition, at a temperature of 175 to 325° F. and a pressure of 300 to 800 psi.

13. The drilling fluid of claim 1, which has a static sag factor in a range of 0.480 to 0.525 at an inclined condition of 30 to 60°, at a temperature of 175 to 325° F., and a pressure of 300 to 800 psi.

14. The drilling fluid of claim 1, which has a dynamic sag tendency in a range of 0.05 to 1.5 ppg at a temperature of 75 to 200° F. and a shear rate of 50 to 200 RPM.

15. The drilling fluid of claim 1, which has a ten-second gel strength of 20 to 32 lb/100 ft$^2$, a ten-minute gel strength of 50 to 95 lb/100 ft$^2$, and a thirty-minute gel strength of 60 to 110 lb/100 ft$^2$, at a temperature of 75 to 200° F.

16. The drilling fluid of claim 1, which has a plastic viscosity of 35.5 to 40 cP at a temperature of 75 to 200° F.

17. The drilling fluid of claim 1, which has a yield point of 35 to 55 lb/100 ft$^2$ at a temperature of 75 to 200° F.

18. A method of drilling a subterranean geological formation, comprising:
   driving a drill bit to form a wellbore in the subterranean geological formation; and
   injecting the drilling fluid of claim 1 into the subterranean geological formation through the wellbore,
   wherein the synthetic modified phyllosilicate prevents sagging of the weighting agent in the wellbore.

19. A drilling fluid, made by the process comprising:
providing
   an aqueous base fluid in a mixing container,
adding thereto, and mixing,
   an inorganic base,
   a weighting agent comprising barite, and
   in an amount of 0.05 to 0.2 wt % based on a total weight of the drilling fluid,
   wherein:
      the synthetic modified phyllosilicate comprises
         60 to 70 wt % of Si,
         25 to 35 wt % of Mg,
         1.8 to 2.8 wt % of Na, and
         1.7 to 2.7 wt % of a metal which is at least one selected from the group consisting of ruthenium, rhodium, palladium, osmium iridium, and platinum, each relative to a total weight of XRF-active elements present in the synthetic modified phyllosilicate.

20. A drilling fluid, comprising:
an aqueous base fluid,
a inorganic base,
a weighting agent comprising barite, and
a phyllosilicate present in an amount of 0.05 to 0.2 wt % based on a total weight of the drilling fluid,
wherein:
the phyllosilicate comprises
   60 to 70 wt % of Si,
   25 to 35 wt % of Mg,
   1.8 to 2.8 wt % of Na, and
   1.7 to 2.7 wt % of a metal Which is at least one selected from the group consisting of ruthenium, rhodium, palladium, osmium, iridium, and platinum, each relative to a total weight of all elements at least as heavy as sodium present in the synthetic modified phyllosilicate.

\* \* \* \* \*